June 28, 1927.

E. W. NELSON 1,634,203

DEMOUNTABLE RIM

Filed Feb. 8, 1927

Ernst W. Nelson Inventor

By Geo. P. Kimmel
Attorney

June 28, 1927.  E. W. NELSON  1,634,203
DEMOUNTABLE RIM
Filed Feb. 8, 1927    2 Sheets-Sheet 2
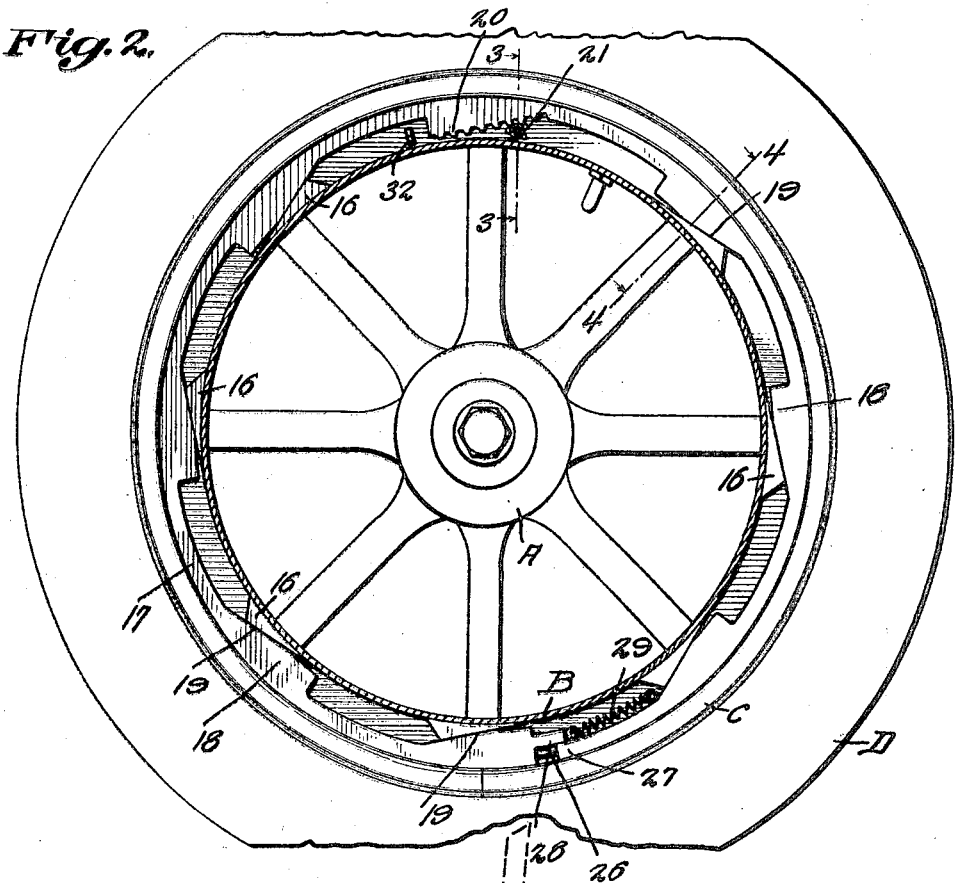
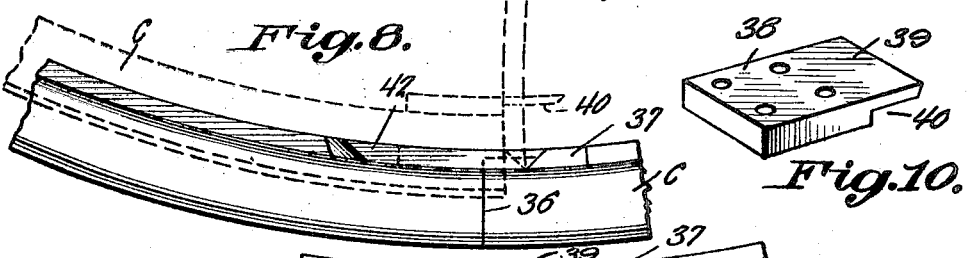
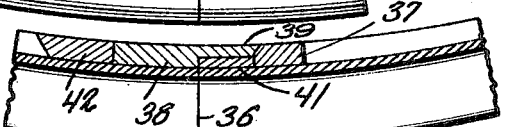
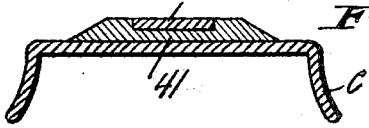

Patented June 28, 1927.

1,634,203

UNITED STATES PATENT OFFICE.

ERNST W. NELSON, OF ONG, NEBRASKA.

DEMOUNTABLE RIM.

Application filed February 8, 1927. Serial No. 166,723.

The invention relates to a demountable rim, and more especially to a wheel rim lock of the demountable type.

The primary object of the invention is the provision of a device of this character, wherein the demountable rim when engaged upon the felloe of a wheel can be firmly and securely locked thereon, without the necessity of the use of the customary group or series of clamps detachably bolted at equal distance apart about one face of the felloe to engage and hold the rim in place thereon.

Another object of the invention is the provision of a device of this character, wherein the rim locking or holding device will be housed within the felloe and will permit of the quick demounting and mounting of the rim relative to the felloe.

A further object of the invention is the provision of a device of this character, wherein a single expansible unit is employed to make fast upon the felloe the demountable rim, the actuation of the unit being controlled at one point of the felloe and when the rim is made fast thereon, it will be relieved from squeaking or creeping upon said felloe.

A still further object of the invention is the provision of a device of this character, wherein minimum parts are employed and the demountable rim can be mounted upon the felloe or removed therefrom with dispatch and without excessive labor on the part of an operator.

A still further object of the invention is the provision of a device of this character, which is extremely simple in construction, thoroughly reliable and efficient in its purpose, strong, durable, and inexpensive to manufacture and install.

With these and other objects in view, the invention consists in the features of construction, combination and arrangement of parts, as will be hereinafter more fully described in detail, illustrated in the accompanying drawings, showing the preferred embodiment of the invention, and pointed out in the claims hereunto appended.

In the accompanying drawings:—

Figure 2 is a vertical sectional view through the felloe of a wheel, showing in detail the expansible unit of the device for securing the rim upon the felloe.

Figure 8 is a fragmentary vertical longitudinal sectional view through the rim showing by full lines the split therein closed and by dotted lines one end of the rim raised for the opening of the split therein by the lever shown in Figure 6 of the drawing.

Figure 9 is a view similar to Figure 8 showing the ends of the rim joined with the split closed and locked.

Figure 10 is a detailed perspective view of another of the locking plates for the rim.

Figure 11 is a sectional view taken on the line 11—11 of Figure 5.

Similar reference characters indicate corresponding parts throughout the several views in the drawings.

Figure 1:
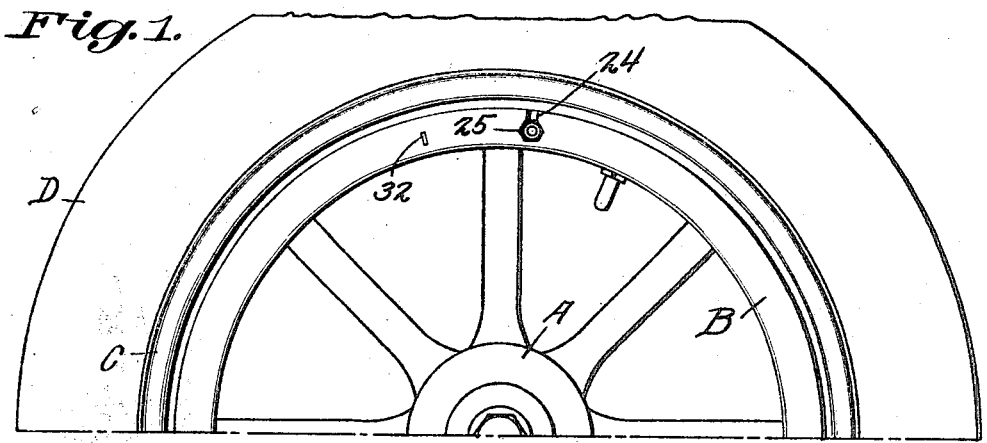
Figure 1 is a fragmentary side elevation of a wheel, showing the demountable rim mounted upon the felloe and held fast thereon in accordance with the invention.

Referring to the drawings in detail, A designates generally a spoked vehicle wheel of the automobile type having the felloe B upon which is engaged the demountable rim C carrying the usual pneumatic tire D, the rim C being of the split type for permitting the removal of the tire D therefrom when the occasion requires.

The felloe B of the wheel A is of the metal type bent to provide an annular shell having an innermost circumferentially disposed wall 10 and an outermost circumferential wall 11, from which latter is spaced an intermediate wall 12, these walls being unbroken circumferentially of the wheel A. The wall 12 is joined with the wall 10 by a web 13, the same being formed at its inner side with an outwardly inclined portion which merges into the wall 10 and provides an inside annular abutment 14 for the demountable rim C. The wall 12 is positioned a greater distance from the wall 10 than from the wall 11 and said walls 11 and 12 of the felloe B provide therebetween a continuous groove 15 opening adjacent the inner face of the rim C for a purpose presently described. Within the groove 15 and integrally formed with the base of the felloe B at spaced intervals circumferentially thereof are beveled risers 16, although these may be separate from the felloe and secured within the groove 15 in any suitable manner. Located within the groove 15 in the felloe B is a concentric split expanding ring or hoop 17, the inner peripheral edge of which has formed at intervals thereon spreader projections or lugs 18, each having a beveled riding surface 19 reversely disposed to the bevel of its companion riser 16. At a predetermined point on the inner peripheral edge of the ring or hoop 17 preferably diametrically opposite to the split therein is a projection having an inclined face provided with teeth, and with the inclination of such face being substantially the same as the bevel surface 19 of each spreader projection 18. The teeth on the inclined face of the projection provide a toothed rack 20.

The rack 20 is in meshing engagement with a toothed pinion 21 made fast upon a sleeve 22 loosely journaled upon a bolt member 23 mounted transversely in the felloe B and made fast against rotation in the walls 10, 11 and 12 of the latter. The sleeve 22 is insertable in a notch 24 formed in the wall 11 of the felloe B and has its outer end terminating in a wrench engaging head 25 located exteriorly of the felloe B. It will be apparent that by rotating the head 25 motion will be imparted to the pinion 21 which is free to rotate upon the bolt 23 and by rotation of the pinion the rack 20 will be shifted by reason of the meshing engagement of said pinion 21 with the teeth of the rack, thus shifting the ring circumferentially in the groove 15 in the felloe B for a purpose presently described.

At the split 26 in the ring or hoop 17 the ends 27 and 28 of the same slidably overlap each other and with the end 28 is connected a coiled retractor spring 29, the same being connected with the ring or hoop 17 spaced from the end 27 thereof. This spring 29 serves to contract the ring or hoop 17, when the spreader lugs 18 are caused to ride off of the risers 16 as will be clearly apparent. The bolt 23 at the end portion thereof carrying the sleeve 22 is suitably threaded at 30 to accommodate a jamb nut 31 thereon which is designed to lock the wrench engaging head 25 after the adjustment of the pinion 21 so as to lock and hold the expansion ring or hoop 17 in its adjusted position.

Arranged within the groove 15 in the felloe B in the path of the toothed rack 20 is a stop 32 which limits the revolving of the ring 17 in one direction, this being obvious from Figure 2 of the drawing.

Figures 3, 4:
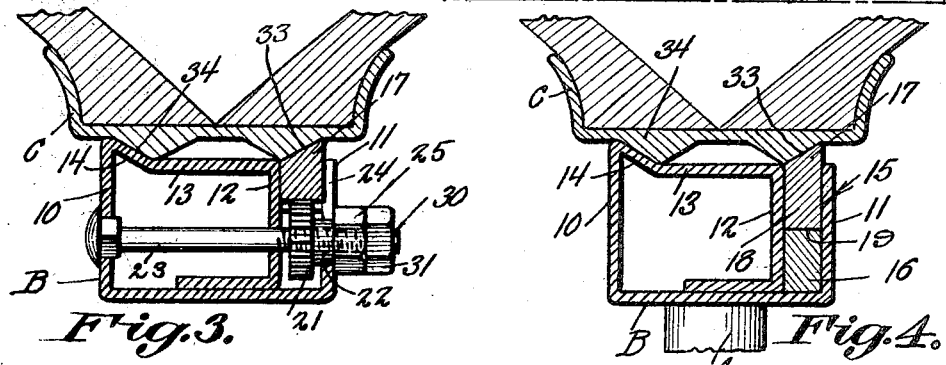
Figure 3 is a fragmentary sectional view taken on the line 3—3 of Figure 2 looking in the direction of the arrows.
Figure 4 is a fragmentary sectional view taken on the line 4—4 of Figure 2 looking in the direction of the arrows.

The outer peripheral edge of the ring 17 is formed with a reversely beveled face 33 relative to the abutment 14 so that this outer peripheral edge of said ring 17 will act as the outside abutment for the demountable rim C when engaged on the felloe B as will be clearly apparent from Figures 3 and 4 of the drawings.

Figure 6:
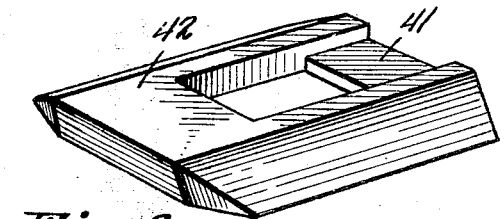
Figure 6 is a detailed perspective view of the joint separating lever for the rim.
Figure 5:
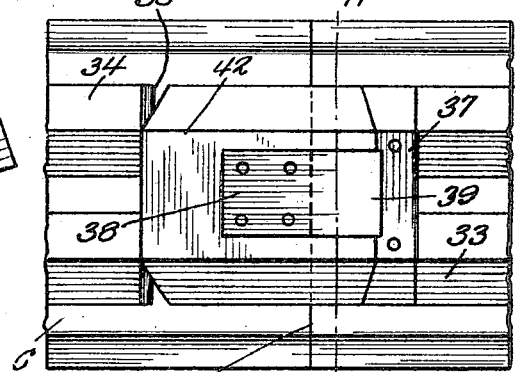
Figure 5 is an enlarged fragmentary plan view looking toward the inner face of the demountable rim, showing the split joints therein and the locking plates for said joints.
Figure 7:
Figure 7 is a detailed perspective view of one of the locking plates for the split rim.

The rim C on the inner peripheral face thereof is formed with spaced reversely beveled annular retaining ribs 33, 34 which cooperate with the abutments of the felloe B, so that the demountable rim may be securely held against lateral displacement upon the felloe, this being obvious from Figures 3 and 4 of the drawings. Between the opposed ends of the ribs 33, 34 there is positioned a keeper plate 37 and a locking plate 38. The split in the rim is indicated at 36. The plate 37 is carried by one end of the rim and the plate 38 by the other end thereof and is adapted to extend on the end of the rim carrying the plate 37 when the split 36 is closed. This plate 38 is formed with a tongue 39 projecting therefrom to abut the keeper plate 37 when the joint or split 36 is closed and the ends of the rim C are aligned and flush with each other. The tongue 39 is formed by undercutting at 40 the plate 38 for a distance of its length and adapted to occupy this undercut 40 in the plate 38 is the reduced crossed member 41 of an unlatching lever 42 the latter being of substantially rectangular form and is normally lowered in the gap 35 formed between the opposed ends of the ribs 33, 34 of the rim C. This is the normal position of the lever 42 when the joint or split is closed and the ends of the rim are in abutting relation to each other with the tongue 39 of the locking plate abutting the keeper 37, so that the rim C will be locked at its split or joint. The thicker part of the plate 38 sets in an opening formed in the lever 42, see Figures 6 and 8. Now if it is desired to separate the ends of the rim C and open the split or joint therein the lever 42 is pulled outwardly so that its cross member 41 will act as a fulcrum in the undercut 40 of the locking plate 30 and when the lever 42 is swung to the dotted line position shown in Figure 8 of the drawings the tongue 39 of the plate 38 will have been sprung out of engagement with the keeper 37 for the breaking of the joint at the split in the rim C and in this manner permit the removal of the tire D therefrom, when said rim C has been demounted from the felloe B of the wheel A.

When the tire D is engaged on the rim C and it is desired to mount the rim upon the felloe B of the wheel, the operator turns the head 25 on the sleeve 22 having the pinion 21, the nut 31 having been loosened from the bolt 23 and such pinion cooperating with the rack 20, will cause the ring 17 to be circumferentially shifted in the groove 15 in the felloe B in a direction toward the stop 32.

When the rack 20 contacts with the stop 32, the ring 17 will become contracted to recede within the groove 15, whereby the rim C can be readily placed upon the felloe B and have the rib 34 positioned against the abutment 14 on said web 13. Thereafter the pinion 21 is caused to move clockwise shifting the rack 20 moving the ring 17 in a direction to cause the spreader lugs 18 to ride upon the risers 19, which will effect the spreading of the ring 17, whereby it will engage with the outermost rib 33 on the rim C and constitute an outside abutment for the rim C and in this manner firmly and securely fastening the rim upon the felloe of the wheel.

When the rim C has been made fast and firm upon the felloe B the operator jambs the nut 31 against the head 25 to lock the pinion against further rotation, as the head 25 will be wedged or clamped between the outside wall 11 of the felloe and said nut 31 as will be clearly apparent from Figure 3 of the drawings.

From the foregoing it is thought that the construction and manner of operation of the device will be clearly understood and therefore a more extended explanation has been omitted.

What is claimed is:—

1. In a wheel, the combination with a felloe having an annular groove adjacent to one side thereof and opening through the outer periphery thereof, an abutment formed on the felloe circumferentially thereof at the side opposite the groove, a demountable rim engageable on the felloe and having inner spaced circumferentially arranged abutments, one of the abutments being cooperative with the abutment on the felloe, a split partially overlapping expansion ring mounted in the groove in the felloe and having spaced beveled projections, risers arranged in the base of the groove and coacting with the beveled projections on the ring to effect the expansion and contraction of the latter and when expanded to engage and lock the other abutment on the demountable rim, a toothed rack formed on the inner periphery of the ring, a pinion arranged in the groove in the felloe and meshing with the toothed rack, an actuating head connected with the pinion and disposed exteriorly of the felloe, means rotatably supporting the pinion in the felloe, and means carried by the last named means and cooperating with said head to maintain it fast after adjustment of the pinion.

2. In a wheel, the combination with a felloe having an annular groove adjacent to one side thereof and opening through the outer periphery thereof, an abutment formed on the felloe circumferentially thereof at the side opposite the groove, a demountable rim engageable on the felloe and having inner spaced circumferentially arranged abutments, one abutment being cooperative with the abutment on the felloe, a split partially overlapped expansion ring mounted in the groove in the felloe and having spaced beveled projections, risers arranged in the base of the groove and coacting with the beveled projection on the ring to effect the expansion and contraction of the latter and when expanded to engage and lock the other abutment on the demountable rim, a toothed rack formed on the inner periphery of the ring, a pinion arranged in the groove in the felloe and meshing with the toothed rack, an actuating head connected with the pinion and disposed exteriorly of the felloe, means rotatably supporting the pinion in the felloe, means carried by the last named means and cooperating with said head to maintain it fast after adjustment of the pinion, and means for tensioning the overlapped portion of the split ring.

3. In a wheel, the combination with a felloe having an annular groove adjacent to one side thereof and opening through the outer periphery thereof, an abutment formed on the felloe circumferentially thereof, at the side opposite the groove, a demountable rim engageable on the felloe and having inner spaced circumferentially arranged abutments, one abutment being cooperative with the abutment on the felloe, a split partially overlapped expansion ring mounted in the groove in the felloe and having spaced beveled projections, risers arranged in the base of the groove and coacting with the beveled projection on the ring to effect the expansion and contraction of the latter and when expanded to engage and lock the other abutment on the demountable rim, a toothed rack formed on the inner periphery of the ring, a pinion arranged in the groove in the felloe and meshing with the toothed rack, an actuating head connected with the pinion and disposed exteriorly of the felloe, means rotatably supporting the pinion in the felloe, means carried by the last named means and cooperating with said head to maintain it fast after adjustment of the pinion, means for tensioning the overlapped portion of the split ring, and means located in the groove in the felloe in the path of movement of the toothed rack to limit the movement of the latter in one direction.

In testimony whereof, I affix my signature hereto.

ERNST W. NELSON.